United States Patent Office 3,404,605
Patented Oct. 8, 1968

3,404,605
SYSTEM FOR CONTROLLING HYDRAULIC SERVOMOTORS
Klaus Pfaff, Meersburg, Germany, assignor to Dornier-Werke G.m.b.H., Friedrichshafen (Bodensee), Germany, a corporation of Germany
Filed Aug. 26, 1965, Ser. No. 482,700
Claims priority, application Germany Sept. 18, 1964, D 45,449
5 Claims. (Cl. 91—453)

ABSTRACT OF THE DISCLOSURE

This invention relates to a system for controlling mechanically coupled hydraulic servomotors, each of which is equipped with a separate control valve and wherein the control valve pistons are mechanically coupled and can be displaced both by an electrohydraulic control member and by a mechanical linkage. Coordinated to each hydraulic control circuit of the electrohydraulic control member is a switching device which, in case of failure of the electrical energy circuit or in case the electrical control signal exceeds a predetermined value, operates to render the hydraulic control circuit inactive or inoperative. A blocking of the control valve pistons thereby is effectively prevented.

---

Figure 1:
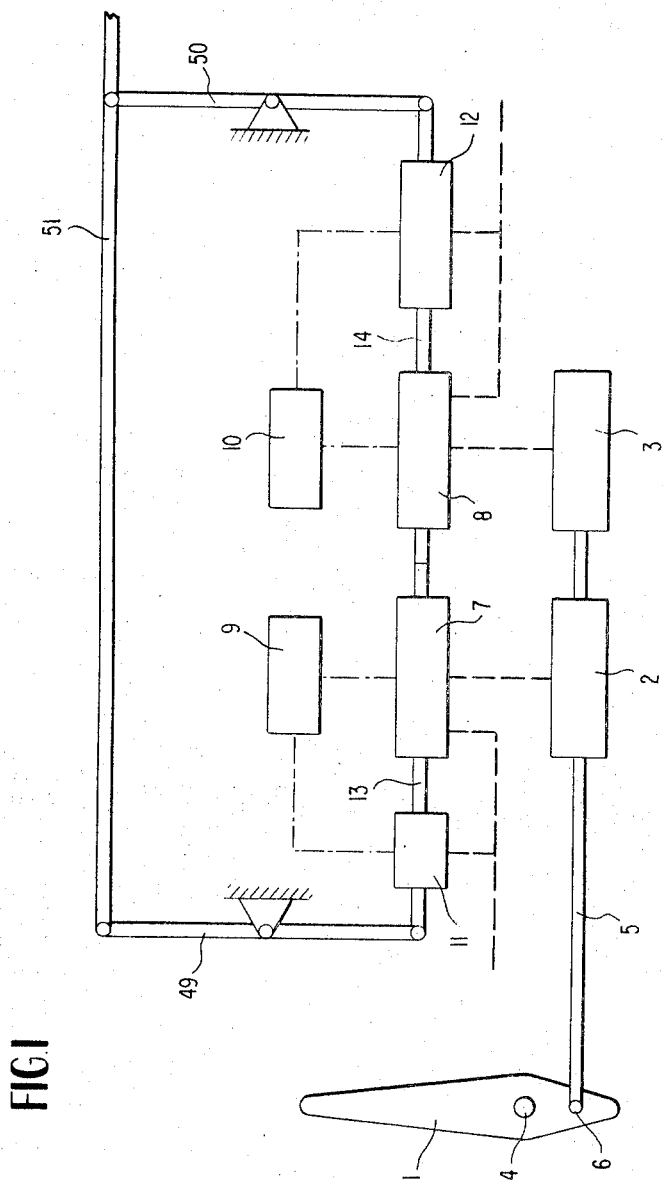

The construction of heretofore known control systems with two and, in some cases, even three servomotors, is commonly utilized for safety considerations. Coordinated to each of the two or three servomotors and the control valves thereof is a separate hydraulic and electric energy circuit. Each electrohydraulic control member has an electrical and a hydraulic control circuit, both of which are supplied by the corresponding energy circuits. In the construction of the control system including two servomotors, the hydraulic and electrical supply lines thus are duplicated. All of the structural elements which are connected to these dual devices also are duplicated in order that failure of one circuit will not result in the entire system being rendered inoperative.

In a known construction, the control valves and the servomotors are mounted in a tandem arrangement. In this construction, the tandem control valve is a duplication of the heretofore customary control valve. Both hydraulic energy circuits of this control system operate simultaneously and failure of one hydraulic circuit does not, therefore, result in any difficulty. Not satisfactorily solved, on the other hand, is the problem of the failure of an electrical energy circuit. In the case of a failure of one or both electrical energy circuits, the pilot can overbridge the electrical control mechanically. A continuation of the electrical control after the failure of one electrical circuit was not possible heretofore, however, since the restoration of the failed electrical control circuit influences the respectively coordinated hydraulic control circuit in a manner opposite to the desired control so that a blocking of the control valve pistons results, due to the oppositely working hydraulic control circuits which had not failed.

The present invention provides a control system in which the electrical controls continue to operate in case of a failure of an electrical energy circuit. Coordinated to each hydraulic control circuit of the electrohydraulic control member is a switching device which, in case of a failure of the electrical energy circuit or in case the electrical control signal exceeds a predetermined value, operates to render the hydraulic control circuit inactive or inoperative. A blocking of the control valve pistons thereby is effectively prevented. The switching device or means comprises a by-pass or disconnecting valve which is actuated by an automatic auxiliary control valve. The auxiliary control valve includes a cylinder with a floating piston, which latter is axially displaceably mounted on an elongated control valve piston rod which extends through the auxiliary control valve cylinder. The floating piston is retained in the central position thereof by adjustable spring means and the stroke is limited on both sides by check rings which are mounted on the control valve piston rod. The adjustable spring force thus determines the divergence or variation of the electrical control signal from the theoretical value thereof. The cylinder chambers of the auxiliary control valve, being separated by the floating piston, are in communication, by way of hydraulic connecting lines, with the oppositely working cylinder chambers of the control valve. At different pressures in the cylinder chambers of the control valve, the control valve piston and the floating piston of the auxiliary control valve are moved simultaneously. Further, the auxiliary control valve is connected with the by-pass valve, by means of hydraulic connecting lines, in a manner such that in case of oppositely directed movements of the control valve piston and the floating piston, the by-pass valve is kept open whereas, in the case of movements occuring in the same direction, the floating piston closes the by-pass valve.

Figure 2:
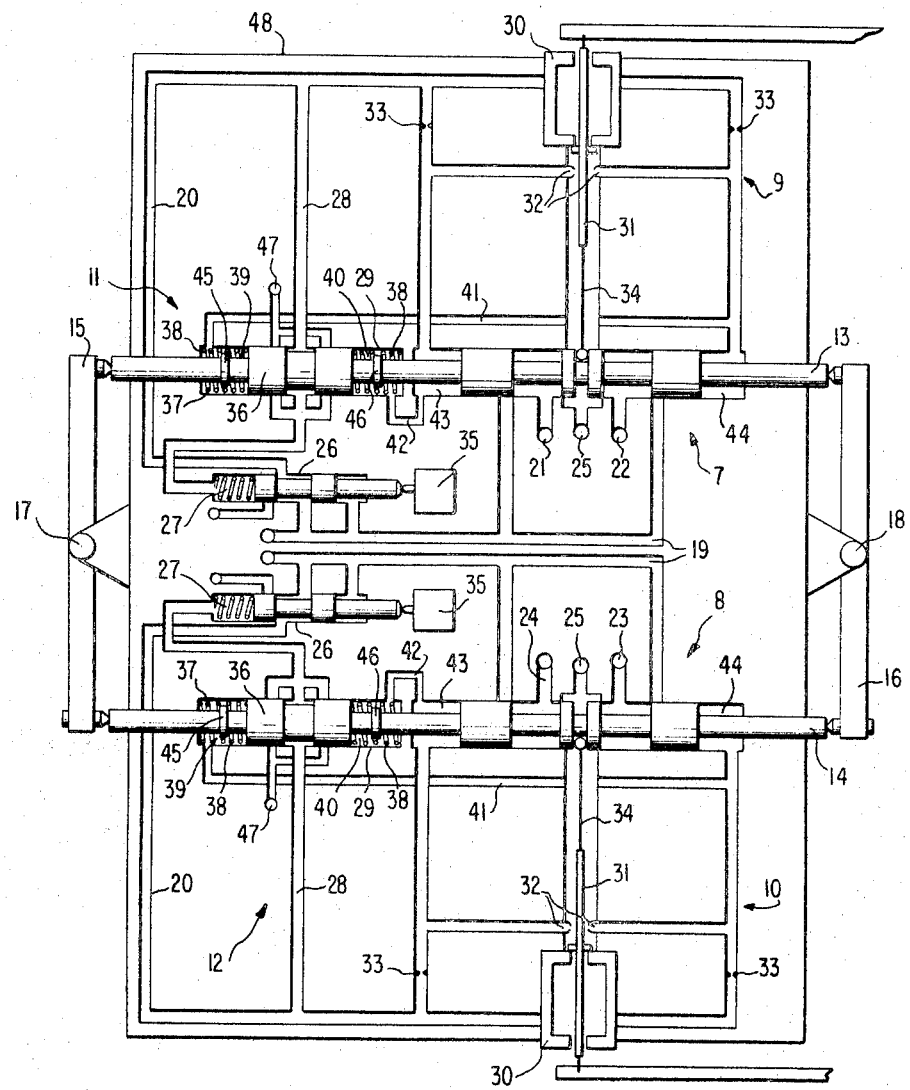

The present invention will be further illustrated by reference to the accompanying drawings in which
FIGURE 1 is a schematic representation of the control system, and
FIGURE 2 illustrates two control valves positioned side by side together with the by-pass or disconnecting mechanism.

Referring to FIGURE 1, the control surface 1 is pivotal about the axis 4 by the hydraulic servomotors 2 and 3, which are mounted in tandem. The servomotors 2 and 3 have a continuous common piston rod 5 which acts on the control surface 1 through the hinge 5. Pressure fluid is supplied, through the lines shown in phantom, to the hydraulic control valves 7 and 8 and from the latter to the servomotors 2 and 3. The control valve pistons have continuous piston rods 13 and 14 which are mechanically coupled. Actuation of the control valves may be effected either by means of the electrohydraulic control members 9 and 10 or by means of the mechanical linkage 49, 50, and 51. Included in the hydraulic control circuits of the electrohydraulic control members 9 and 10, which circuits are shown in phantom, are the switching devices 11 and 12 which, in case of the failure of an electrical control circuit will disconnect the respectively coordinated hydraulic control circuit.

Referring to FIGURE 2, the control valves 7 and 8, the electrohydraulic members 9 and 10, and the switching devices 11 and 12 are combined into a single structural unit 48 with the control valves being positioned side by side in a particularly advantageous manner. All other parts of the control system have been omitted from the drawing in the interest of clarity. The bores for the control valve pistons, which are rather difficult to manufacture, are more easily fabricated in the construction of the present invention than in the case of tandem mounts. The piston rods 13 and 14 are mechanically coupled; the coupling members are the two-armed levers 15 and 16 which are secured to the structural unit 48 on the pivot pins 17 and 18.

Pressure fluid is supplied to the control valves 7 and 8 by the lines 19. Depending upon the position of the control valve pistons, the pressure fluid is further conveyed, through the lines 21 and 23 or 22 and 24, to the servomotors 2 and 3, not shown; the lines 25 are return lines. Connected to the lines 19 are the hydraulic control circuits of the electrohydraulic control members 9 and 10, which latter are of a generally known construction. They consist of a polarized electric motor 30 which moves a flutter cap 31 between two nozzles 32. The outlet openings between the nozzle tips and the surfaces of the flutter cap thereby are varied. The throttle points 33 in the pressure fluid lines prevent a backsurge and the pressure difference between the nozzle lines becomes effective at the control valve pistons, which latter are mechanically connected with the flutter caps 31 by means of the return coupling springs 34. Other electrohydraulic members, such, for example, as a hydraulic feedback coupling, also may be employed in this construction.

Included in the main lines 20 of the hydraulic control circuits are the by-pass valves 26. The chambers 27 of the by-pass valves 26 are connected with the main lines 20 by means of the secondary lines 28. Due to the fluid pressure prevailing in the chambers 27, and as a result of the force exerted by the springs in the chambers 27, the by-pass valves 26 are kept open. The auxiliary control valves 29 are constructed in a manner such that in case of a malfunction of one of the electrical control circuits, they will connect one of the chambers 27 with the return line 47, by movement of the floating piston 36, with the result that the pressure in the chamber 27 is relieved and the by-pass valve 26 will close the main line 20. Simultaneously, a signal switch 35 is actuated which indicates the malfunction or failure to the pilot.

The auxiliary control valve 29 includes a cylinder 37 having a floating piston 36 therein, which latter is axially displaceably mounted on the elongated control valve piston rod 13 and 14 respectively, which extends through the auxiliary control valve cylinder. The floating piston 36 is retained in the central position by the helical springs 38. The compressive force of the springs determines the switching range in which the switching device remains unresponsive. Minor differences in the signal inputs of the electrical control circuits thereby may be compensated. The cylinder chambers 39 and 40 of the auxiliary control valves, which chambers are separated by the floating piston 36, are in communication with the oppositely working cylinder chambers 43 and 44 of the control valves by means of the connecting lines 41 and 42 so that, in case of varying pressures in the cylinder chambers of the control valves, the control valve pistons and the floating pistons 36 are simultaneously moved. The movements of the floating pistons 36 are limited by the check rings 45 and 46 mounted on the control valve piston rods. During oppositely directed movements of the control valve pistons and the floating pistons 36, the by-pass valves 26 are kept open. When the floating piston 36 of an auxiliary control valve moves in the same direction as the control valve piston, the chamber 27 of the by-pass valve is connected with the return line 47 and, thus, the pressure in the chamber 27 is relieved. The by-pass valve 26 closes the hydraulic control circuit.

FIG. 2 illustrates the control unit in a neutral position wherein no displacement is taking place. Hydraulic pressure is supplied to the electrohydraulic control means through the line 20, and hydraulic pressure is supplied through line 28 to the chamber 27 of the by-pass valve, holding the by-pass valve to the right as shown in this figure, which is its normal position when the apparatus is functioning properly. In this neutral position, the floating piston 36 is retained centered in its associated cylinder by the springs 38.

During normal operation of the apparatus, the floating piston will tend to move in a direction opposite to the movement of the associated piston rod upon which it is mounted. The check rings 45 and 46 on the piston rod limit such movement of the floating piston so that in normal operation the floating piston is retained substantially in the center of its associated cylinder so as not to uncover a port to the return line 47. Accordingly, hydraulic pressure is continuously provided within chamber 27 of the by-pass valve during normal operation to retain the by-pass valve in the position shown.

Upon malfunction of the electrohydraulic control means, the floating piston will tend to move in the same direction as the associated piston rod, thereby uncovering a port to the return line 47, which allows the hydraulic pressure to be relieved from chamber 27 of the by-pass valve, whereupon the by-pass valve will be moved to the left to close off the hydraulic circuit through line 20 to the control circuit.

In this manner, the by-pass valve is adapted to operate to close off only the control circuit which is malfunctioning, while the associated servo circuit remains operative.

As a result of the switching devices in the hydraulic control circuits of the electrohydraulic control members, it is possible for a control system to contain any desired number of servomotors. It is particularly advantageous that, in the event of a failure of one or even several electrical control circuits, the output of the servomotors remains unchanged. Accordingly, also when actuating the control of the control system by means of only one electrical control circuit, the output of the servomotors will not be reduced.

It will be obvious to those skilled in the art that many modifications may be made within the scope of the present invention without departing from the spirit thereof, and the invention includes all such modifications.

What is claimed is:

1. In combination, a plurality of servomotors, a system for controlling said servomotors including a plurality of hydraulic servo circuits each of which controls the operation of an associated servomotor, each servo circuit having a control valve, said control valves including pistons and piston rods, the piston rods of the control valves being mechanically interconnected with one another, said system including a plurality of control circuits each of which controls the operation of one of said control valves, each control circuit including electrohydraulic control means, switching means connected with each of said hydraulic control circuits for rendering the associated hydraulic control circuit inoperative, each switching means including a by-pass valve and an auxiliary control valve for controlling the operation of said by-pass valve, said auxiliary control valve including a cylinder having a floating piston therein, said floating piston being movably mounted on an associated control valve piston rod, means for limiting relative movement between said floating piston and the associated control valve piston rod, and means for moving said floating piston relative to the associated control valve piston rod upon malfunction of said electrohydraulic control means so as to operate the associated by-pass valve to render the associated hydraulic control circuit inoperative while the associated servo circuit remains operative.

2. Apparatus as defined in claim 1 including means for retaining said floating piston in a central position within the associated cylinder.

3. Apparatus as defined in claim 1 wherein the means for moving said floating piston relative to the associated control valve piston rod includes oppositely-working cylinder chambers of the associated control valve, and lines connecting cylinder chambers of said auxiliary control valve with said oppositely-working cylinder chambers of the control valve.

4. Apparatus as defined in claim 1 including means connecting said auxiliary control valve with said by-pass valve whereby, in case of opposite movements of the floating piston and the associated control valve piston rod, the by-pass valve remains open, and in case of movements in the same direction, the by-pass valve is closed.

5. Apparatus as defined in claim 2 wherein said control valves are mounted side-by-side.

(Other references on following page)

References Cited

UNITED STATES PATENTS

| | | | |
|---|---|---|---|
| 2,947,285 | 8/1960 | Baltus et al. | 91—453 |
| 2,950,703 | 8/1960 | Fletcher et al. | 91—453 |
| 3,034,483 | 5/1962 | Rasmussen | 91—384 |
| 3,143,042 | 8/1964 | Borgeson et al. | 91—367 |
| 3,190,185 | 6/1965 | Rasmussen | 94—411 |
| 3,220,317 | 11/1965 | Fuell | 91—384 |
| 3,270,623 | 9/1966 | Garnjost et al. | 91—387 |

EDGAR W. GEOGHEGAN, *Primary Examiner.*

B. L. ADAMS, *Assistant Examiner.*